United States Patent [19]

Swenson

[11] Patent Number: 5,192,022
[45] Date of Patent: Mar. 9, 1993

[54] FUEL-FIRED HEAT PUMP SYSTEM

[75] Inventor: Paul F. Swenson, Shaker Heights, Ohio

[73] Assignee: Consolidated Natural Gas Service Company, Inc., Pittsburgh, Pa.

[21] Appl. No.: 888,910

[22] Filed: May 26, 1992

[51] Int. Cl.⁵ ............................................. F25B 27/00
[52] U.S. Cl. .................................... 237/2 B; 62/323.1
[58] Field of Search ........... 237/2 B, 12.1, 13, 12.3 A, 237/12.3 B, 12.3 C, 12.3 R; 62/323.1, 238.7, 238.6; 123/41.19

[56] References Cited

U.S. PATENT DOCUMENTS

| | | | |
|---|---|---|---|
| 4,697,434 | 10/1987 | Yuyama | 62/323.1 |
| 4,715,192 | 12/1987 | Katz | 237/13 X |
| 4,976,464 | 12/1990 | Swenson | 237/81 |

OTHER PUBLICATIONS

Automotive Engineering, Feb. 1992, vol. 100, No. 2, "Latent Heat Storage", pp. 58-61.

*Primary Examiner*—Henry A. Bennet
*Attorney, Agent, or Firm*—Pearne, Gordon, McCoy & Granger

[57] ABSTRACT

A heat pump system for an occupied space of a building comprising a fuel-fired heat engine and a heat pump compressor driven by the heat engine, the mechanical horsepower output capacity of the engine being substantially equal to the input power requirement of the compressor, an indoor refrigeration circuit heat exchanger in thermal communication with air in the occupied space, and an outdoor refrigeration circuit heat exchanger in thermal communication with the outdoor environment of the building, a refrigerant circuit connecting the refrigeration heat exchangers and the compressor to permit the compressor to pump heat between the heat exchangers when operated by the engine, a heat storage medium for absorbing heat rejected by the engine during its operation, the heat storage medium having a capacity to store a substantial quantity of heat for a period at least substantially as long as a maximum expected time that the engine is inoperative between ordinary cycles of operation, and a pump for selectively transferring the heat stored in the storage medium to the engine with engine coolant to preheat the engine, after it has been at rest for a time sufficient to cool off, to a temperature substantially equal to its operating temperature.

12 Claims, 3 Drawing Sheets

000

FUEL-FIRED HEAT PUMP SYSTEM

BACKGROUND OF THE INVENTION

The invention relates to improvements in fuel-fired heat pump systems incorporating a heat store for utilizing rejected heat from the fuel-fired prime mover.

U.S. Pat. No. 4,976,464 incorporated herein by reference discloses an arrangement for improving the efficiency of a heat pump system by using the heat rejected by a fuel-fired prime mover in the space conditioning and potable water heating load at the occupied space of a building site. In particular, the system disclosed in the patent recognizes the benefits of using a conventional domestic hot water tank as a heat storage unit for the heat pump fuel-fired prime mover and teaches the avoidance of thermal cycling losses in the heat pump by periodically using heat in the tank to supply the heating load between periods of operation of the heat pump.

In a typical installation, the heat pump compressor and fuel-fired prime mover, usually an internal combustion engine (hereinafter engine), are situated in a cabinet outside of the building to reduce noise and simplify safety measures. Consequently, the compressor and engine are exposed to environmental temperature extremes. When the environmental air is cold, engine starting reliability can suffer and proper lubrication of both the engine and compressor during and following cold start up is difficult. Still further, cold starts of the engine can reduce energy efficiency and involve poor combustion so as to increase harmful engine exhaust emissions. Recognition of lubrication problems with electric heat pump compressors has lead to prior attempts to situate a heat pump compressor or air conditioning compressor indoors where temperature extremes are avoided.

SUMMARY OF THE INVENTION

The invention provides an engine operated heat pump and heat storage system that achieves improved reliability, durability and efficiency. The system, in accordance with the invention, stores rejected engine heat and, at critical start up times, returns the stored heat to the engine/compressor unit to bring its temperature to a predetermined minimum. By causing the engine/compressor unit to operate in a limited temperature range from start up through a period of operation, there is achieved increased starting reliability, reduced mechanical wear for extended service life and improved combustion efficiency for lower exhaust emissions.

In the preferred embodiment, a conventional domestic hot water tank is used as the heat storage tank for storage of heat rejected from the fuel-fired engine. When the engine/compressor unit has been inactive for a period, it cools off by loss of heat to the environment. In accordance with the invention, the circuit for transferring rejected heat is utilized before operation of the engine to preheat the engine/compressor unit. Where the engine/compressor unit is liquid cooled, a pump is operated to circulate coolant to transfer heat from the heat storage tank to the engine/compressor unit. Typically, this heat transfer is accomplished through a heat exchanger to avoid mixing of engine coolant with potable water. The invention has application to heat pump systems even where self-fired hot water tank heaters are not employed. In such situations, rejected heat can be stored in a suitable medium and be later used to preheat the engine compressor unit.

DESCRIPTION OF THE PREFERRED EMBODIMENTS

Figure 1:
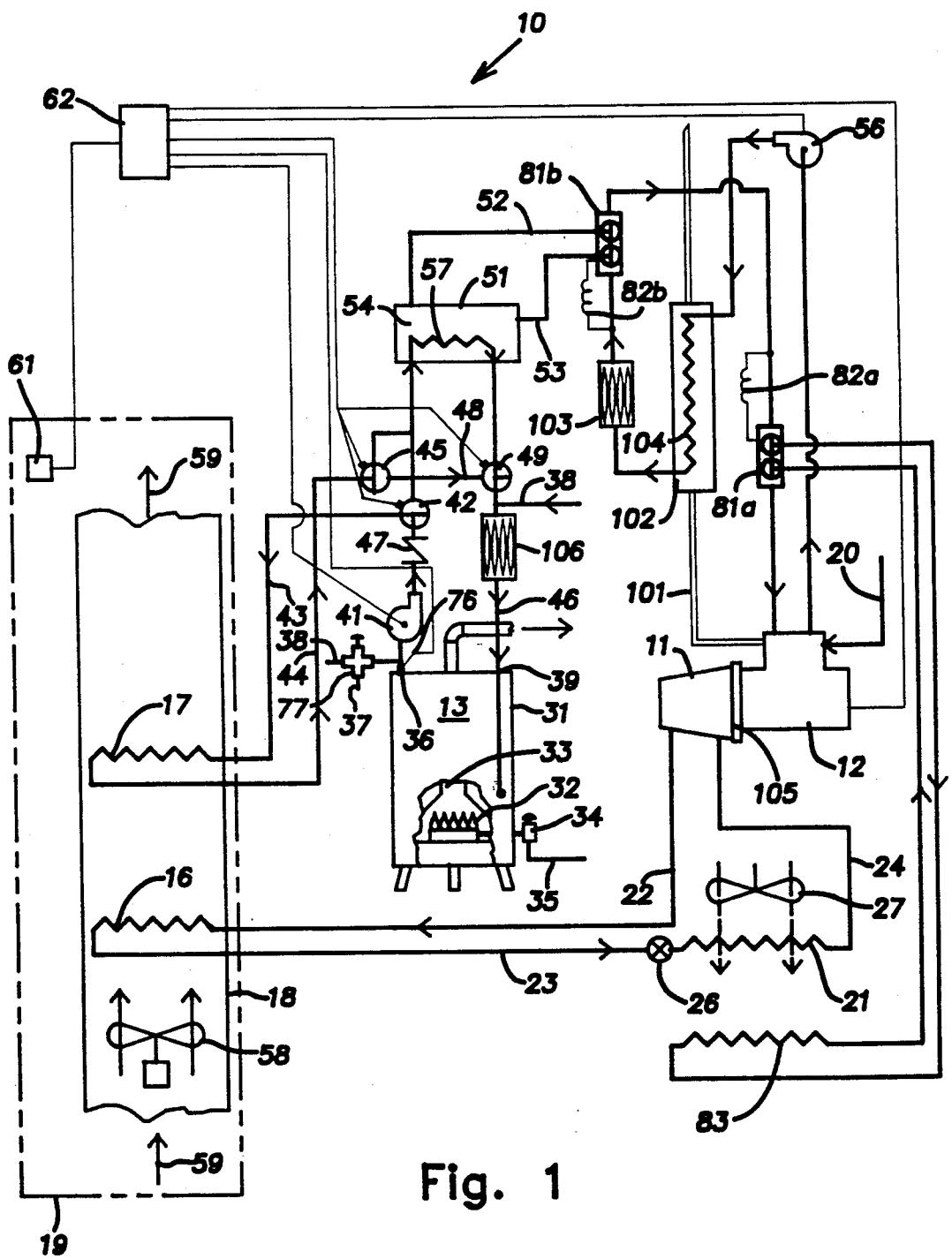
FIG. 1 is a schematic representation of a heat pump system embodying the invention.

FIG. 1 illustrates a heating system 10 suitable for space heating a residential area such as a house, apartment, office or like building space. The system 10 includes a heat pump compressor 11 driven by a prime mover 12 and a storage-type hot water heater 13. The system 10 further includes heat exchanger coils 16 and 17 in a duct 18 through which air from the space being heated is circulated. The closed space being heated or conditioned by the system 10 is schematically illustrated by the broken line 19. The present disclosure involves heating service but it will be appreciated by those familiar with the art that suitable valves and control elements, known in the art, can be provided for operating the heat pump to cool the space 19 being conditioned. For example, U.S. Reissue Pat. No. 31,281 illustrates suitable valving for reversing the heat pump or refrigeration heat exchangers in the context of a fuel-fired heat pump system.

The prime mover 12 is an internal combustion engine or other heat engine such as a Stirling, steam or gas turbine driven unit and is preferably fueled by natural gas or other combustible fuel supplied by a line 20. The illustrated heat pump compressor 11 is preferably a refrigerant vapor compressor producing a reverse Rankine vapor compression cycle. It will be understood that various types of compressors such as reciprocating, screw, vane or centrifugal can be used. Further, a reverse Brayton heat pump cycle can also be used. Typically, the engine 12 and compressor 11 are situated outdoors of the conditioned space 19. Ordinarily, the mechanical power output capacity of the engine is matched to the rated power requirement of the heat pump compressor.

In heating service, a refrigerant fluid, when the heat pump compressor 11 is operating, circulates through the heat exchanger 16 located in the air duct 18 and through another coil or heat exchanger 21 located outdoors and interconnecting lines 22–24. Heat is absorbed by the refrigerant fluid at the outdoor heat exchanger 21 and is exchanged from this fluid to air at the indoor heat exchanger 16. A refrigerant liquid expansion valve 26 in the line 23 causes the refrigerant to enter the outdoor heat exchanger partially vaporized at low pressure and low temperature. The outdoor coil 21 is in heat exchange relation to outdoor or environmental air which may be circulated across the coil by a powered fan 27. Alternatively, the outdoor coil 21 may be in heat exchange relation with sub-surface media such as ground water or with a solar pond. Heat absorbed by the refrigerant as it passes through the coil 21 causes it to be vaporized. The compressor elevates the pressure of the vaporized refrigerant and, therefore, the condensing temperature of the refrigerant fluid before it enters the heat exchanger 16. The refrigerant condenses in the heat exchanger 16 giving up heat.

Relatively high temperature heat storage is preferably provided by the unit 13 in the form of a conventional commercially available storage-type hot water heater. Particularly suited for this application are appliances which comply to American National Standards Institute standard Z-21.10.

The water heater 13 includes a tank 31 with a capacity in the range of 30-50 gallons, for example, and a burner 32 with a capacity in the range of 36,000 to 100,000 btu/hr., for example, centrally located at the bottom of the tank 31. The burner 32 mixes natural gas from a supply line 35 and air and supports combustion of the same. Combustion products from the burner 32 pass through a vertical stack 33 through the center of the tank 31 to heat water stored therein in a known manner.

A conventional thermostatic control valve 34 responds to the temperature of water in the tank 31 and operates the burner 32 whenever the temperature falls below a predetermined limit, for example, 120° F. An outlet 36 on the heater tank 31 supplies hot water through a line 37 to sink taps and the like at the space 19. A source of cold potable water, such as a public utility line, supplies an inlet 39 of the tank 31 through a line 38 to make up for water use at the taps.

A pump 41 operates to circulate hot water stored in the tank 31 through the heat exchanger 17 in the air duct 18. The pump 41 with its inlet connected to the tank outlet 36 circulates the hot water through a first electrically controlled 2-position valve 42, a line 43 to the heat exchanger 17, a line 44 from the heat exchanger to a second electrically controlled 2-position valve 45, a line 48, a third electrically controlled 2-position valve 49 and then through a line 46 to the tank inlet 39. A check valve 47 prevents thermo siphon induced flow between the pump 41 and valve 42 during periods when the pump is not operating.

A liquid-to-liquid heat exchanger 51 is arranged to transfer heat rejected by the engine 12 to water stored in the tank 31. The heat exchanger 51 eliminates mixing of liquid engine coolant with potable water in the tank 31 for health reasons. In the illustrated case, engine coolant circulates through lines 52 and 53 to and from a shell 54 of the heat exchanger 51. An electrically operated pump 56 under the control of a controller 62 operates whenever the engine 12 runs to circulate coolant. A coil 57 of the exchanger 51 is connected across the outlet 36 and inlet 39 of the tank 31 through the valves 42 and 49. The coil 57 is arranged to receive heat when appropriate during engine operation from the engine coolant in the shell 54. Rejected heat from the engine 12 is available at a higher temperature than the temperatures reached by the heat pump refrigerant so that the heat exchanger 17 associated with the rejected heat and with the tank 31 is downstream of the heat pump heat exchanger 16 in the duct 18. A blower 58 circulates air from the space 19 being conditioned through the duct 18 in the direction indicated by the arrows 59 in order to heat this air at the exchangers 16, 17. The engine 12 and heat pump compressor 11 are ordinarily situated out of the enclosed space 19 and normally are housed in an outdoor enclosure.

A thermostat 61 monitors the temperature of air within the space 19 and provides a signal to the controller 62. Whenever the temperature in the space 19 is below a predetermined level, the controller operates the heating system 10 in a novel way to increase its operating efficiency. The controller 62, in response to a signal from the thermostat 61 that there is a demand for heat, causes the engine 12 to start-up and drive the heat pump compressor 11 thereby moving heat from the outdoor coil 21 to the indoor duct coil 16. Thermostatic control switches (not shown) or a signal from the controller 62 causes the blower 58 to operate whenever hot fluid is in either of the coils 16 or 17 so that air within the space 19 is heated by such hot coil or coils. When the thermostat 61 signals the controller 62 that the demand for heat is satisfied, the engine 12 and heat pump 11 are shut off. Heat rejected by the engine 12 during its operation is transferred to the hot water coil 57 and, by circulation of water to and from the tank 31 through operation of the pump 41 is transferred into the tank 31 where it is stored, or is conducted to the duct heat exchanger coil 17 where it is used to heat air, or it is transferred to both the tank 31 and duct coil 17 depending on the positions of the control valves 42, 45 and 49 as dictated by the controller 62.

Heat in the tank 31 is used to heat the space 19 at appropriate times between periods of operation of the engine 12 and heat pump compressor 11. In a simple effective control strategy, the controller 62 for successive periods of heat demand alternates modes of heat supply between 1) operation of the heat pump 11 and 2) exchange of heat from water in the tank 31 without heat pump operation. In the latter mode, the controller 62 operates the pump 41 to circulate water from the tank 31 to the coil 17; also in this mode, the valves 42, 45 and 49 are preferably moved by the controller 62 to positions in which the coil 57 is bypassed by water circulating from the tank 31. During operation in the first mode, i.e. heat pump operation, heat rejected by the engine 12 depending on the positions of the valves 42, 45 and 49 as determined by the controller 62 can be stored in the tank 31, or simultaneously stored in the tank 31 and exchanged at the duct coil. The last of these options is performed when these valves 42, 45 and 49 are in their illustrated positions. This last option may be the preferred mode during the coldest weather when heat demand is high as the temperature of the air delivered to the space will be maximized.

In a typical residential space of 800 to 3,000 square feet of floor space, the tank 31 can store sufficient heat energy in a 40-50 gallon volume of water in a temperature swing of 160° F. to 120° F., for example, to satisfy a moderate heat load for 15 to 20 minutes. This temperature swing occurs above the temperature, typically 120°, at which the burner 32 is energized, so that all of the heat delivered to the heat exchanger 17 originates in the engine 12. By satisfying a heat demand with operation in the mode where the thermal energy is exclusively supplied from the tank 31, the number of times in an hour or day that the heat pump must be energized is reduced. Consequently, the thermal cycling losses in starting up and shutting down the heat pump 11 are proportionately reduced. As much as a 30% increase in the seasonal coefficient of performance of the heat pump can be expected.

In addition to providing a convenient and economical heat storage means for heat rejected by the engine 12, the water heater 13 is available as a back-up heat source when the burner 32 operates. Additionally, the water heater burner 32 is available to supplement the heating capacity of the heat pump 11 at times of unusually high heat demand or during a defrost mode where the outdoor coil is heated by reverse operation of the heat pump circuit in a known manner. Also, the water heater burner 32 is available at times of relatively low heat demand where it is not comparatively economical to operate the heat pump 11 due to severe cycling losses. When heat demand in the space 19 is relatively low, for example, 20% or less than a design load, the controller 62 discontinues operation of the engine 12 and heat pump 11 and allows the burner 32 to supply required heat. Still further, the water heater serves its ordinary purpose of providing potable hot water.

The maximum temperature set point monitored by the sensor 76 is predetermined for the system and ordinarily will be at least 160° F. and not more than 200° F. A conventional thermostatic blending or tempering valve 77, preferably of the manually adjustable type, is provided in the outlet circuit of the tank 31 to limit the temperature of delivered potable water to 120° F., for example. The thermostatic burner control valve 34 originally supplied with the tank 31 is set to a temperature slightly below the tempering valve temperature to allow preferential use of rejected heat from the engine 12. The disclosed system with the tempering valve 77 and the storage tank 31 has a high utility when operating in a space cooling mode because rejected heat developed in a period of such operation can be stored temporarily for use in relatively short non-coincident demand periods for hot potable water.

A heat exchanger 102 of generally known construction serves to recover rejected heat from an exhaust line 101 of the heat engine 12 transferring it to the engine coolant which is caused by the pump 56 to pass through a coil 104 within the exchanger. Engine coolant from the exchanger coil 104 passes through a heat storage device 103 discussed below, to a diverter valve 81b. In the illustrated embodiment, when the temperature of coolant in the line leaving the storage device 103 is above a predetermined temperature as measured by a control line 82b, the valve 81b directs the coolant to the exchanger 51 where, as described above, it is in heat transfer relation with the potable water circuit.

Coolant received by the valve 81b, whether or not diverted to the exchanger 51 and then returned, is conducted from the valve to another diverter valve 81a and then to the engine 12 for heat transfer therewith. Whenever the temperature of coolant sensed by control line 82a is higher than a predetermined level for safe, efficient operation of the engine 12, the valve 81a diverts the coolant to a heat exchanger 83 typically disposed outdoors to discharge heat to the environment surrounding the space 19. The exchanger 83 can, for example, be in the path of cooling air flow developed by the fan 27. After passing through the exchanger 83 and being cooled, coolant returns to the valve 81a and then to the engine 12.

The heat storage unit 103 preferably includes a phase change medium such as a phase changing hydrated salt. This phase change type of heat storage medium, known in the art, has the advantage of absorbing or discharging heat at a relatively constant temperature and providing a relatively high heat energy storage capacity per unit volume. When the storage unit 103 is saturated with heat, the temperature of coolant leaving it rises. This rise in temperature of the coolant exiting the storage device 103 means that the device has a substantial store of heat. The temperature rise, sensed by the sensor line 82b causes the valve 81b to assume its diverting position sending the coolant to the exchanger 51. The device 103 is sufficiently insulated to maintain the majority of its stored heat for a period at least as long as a maximum expected time that the engine 12 is inoperative between ordinary cycles of operation.

Between periods of its operation the engine compressor unit 12, 11 will cool off. Where the unit 12, 11 is outdoors and the outdoor temperature is relatively cold, the unit may reach a temperature far below its ideal operational temperature. In accordance with the invention, the engine compressor unit is preheated before it is started so as to allow it to operate in a relatively small temperature range. For example, when the engine is liquid cooled, its coolant jacket temperature may be kept between about 160° and 190° as a normal operating temperature.

Preheating of the engine 12 is accomplished by operating the coolant pump 56 to circulate coolant through the coolant jacket passages in the engine before the engine is started. In this mode, the coolant actually works as a heating medium for the engine drawing heat from the storage device 103 at a generally constant temperature corresponding to the temperature of fusion of the salt or phase change medium contained therein. Preheating of the engine 12 and subsequent engine operation is staged by the controller 62. The controller 62 receives a signal that heat is required in the conditioned space 19; the controller, in turn, causes the pump 56 to be actuated as by an electrical motor (not shown) which can be integrated with it in a known construction. When the engine 12 is sufficiently preheated, a condition monitored by an appropriate sensor in the engine such as a conventional thermostatic switch, the engine is started by the controller 62.

It is an important aspect of the invention that the compressor 11 is in effective thermal communication with the engine coolant at least during the engine preheating cycle. In the illustrated embodiment, thermal communication between the compressor and the coolant for the engine is controlled by means of a heat conducting mounting block 105 such that the compressor is warmed to above 70° F., but not above 120° F., when the engine is warmed to above 100° F., but not above 190° F. The preheating of the engine and compressor unit 12, 11 affords a number of important advantages. Reliability in engine starting is improved since the engine, which typically is an internal combustion engine, is more readily started because of ease at which it may be cranked, the volatility of the fuel mixture at moderate temperatures when liquid fuels are utilized and the opportunity to tune the engine for starting in a limited temperature range. Durability of both the engine and compressor is greatly improved because operation of their moving parts occurs in a narrow temperature band for which such parts can be manufactured at close dimensional tolerances and such tolerances can be maintained without undue friction and wear. When prewarmed, the lubricants available to the engine 12 and compressor 11 are also at maximum effectiveness. Still further, improved combustion can be experienced with the engine since there is no need to operate it through a warm up cycle where combustion is difficult to accurately control. Still further, thermal efficiency of the system is improved since energy of fuel is not wasted exclusively to bring the engine and compressor up to a desired operating temperature; rather, it is earlier rejected heat scavenged from the engine 12 and stored that is used to bring the engine up to temperature at a later time.

Since, as earlier suggested, the diverter valve 81b avoids directing of coolant to the heat exchanger 51 until the heat storage unit 103 is saturated with heat, it will be understood that this heat storage unit will be quickly recharged, as a first priority, as soon as the engine is started. The exhaust heat recovery heat exchanger 102 increases the temperature of the coolant above that existing in the jacket of the engine 12 so that the salt or phase change material in the device 103 can be constituted to store heat at a temperature moderately above the ideal or desired operating temperature of coolant in the engine jacket. This somewhat elevated temperature of heat storage in the device 103 is desirable since during preheat of the engine prior to starting, heat exchange from the device 103 to engine coolant and from engine coolant to the engine 12 is readily and quickly accomplished so that the preheat cycle can take a relatively short time.

The heat storage capacity of the system 10 can be extended by incorporating a phase change heat storage device 106, like the unit 103, in the line 46 leading to the tank 31. Such a unit can store a considerable quantity of heat per unit volume as compared to the thermal capacity of potable water stored in the tank 31. This heat storage device 106 can be arranged to absorb or release heat at a temperature slightly below the maximum temperature at which the tank 31 is operated. This heat storage device 106, in addition to potentially affording substantially more heat storage capacity than existing with the tank 31 above, has the advantage of supplying potable water at a generally constant temperature which improves the level of control available for heating air from the heat exchanger 17.

Figure 2:
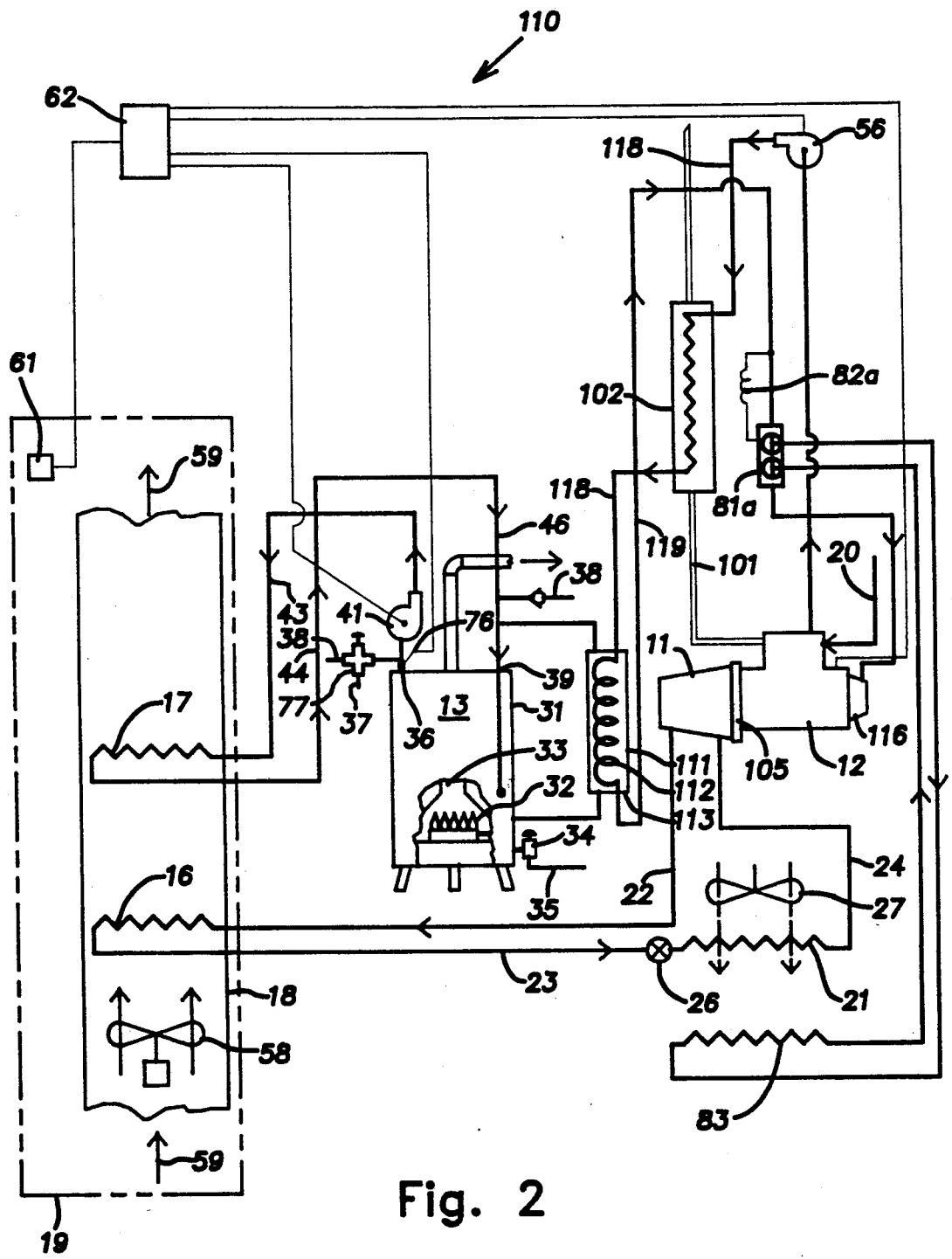
FIG. 2 is a schematic representation of a modified form of a heat pump system embodying the invention.

FIG. 2 schematically shows a simplified system 110 for preheating an engine driven heat pump. Components that correspond in construction and/or operation to those disclosed with reference to FIG. 1 above are given the same reference numerals. In the embodiment of FIG. 2, there is provided a liquid to liquid heat exchanger 111 arranged vertically alongside a conventional storage type hot water tank 13. A coil 112 within a shell 113 of the exchanger 111 is the heat transfer element for coolant for the engine 12 while the shell 113 is the heat exchanging element for potable water in the tank 13. In the illustrated case, the engine 12 is provided with a conventional mechanical shaft driven water or coolant pump 116 as well as a preheat or precirculation pump 56 which is electrically operated by the controller 62. Engine coolant is circulated to and from the coil 112 by the mechanical pump 116 and/or the preheat pump 56 through lines 118, 119. The line 118 is in heat exchange with an exchanger 102 associated with the engine exhaust line 101.

When the engine compressor unit 12, 11 has been at rest for a period sufficient to allow it to cool off, and a need is present for its operation, the controller 62 anticipates this condition and causes the precirculation pump 56 to operate to transfer heat from the vertical heat exchanger 111 to the engine 12 to cause the engine to be warmed to a suitable operating temperature. The vertical orientation of the heat exchanger 111 and its proximity and elevation relative to the tank 13 allows natural convection currents to circulate potable water from the tank 13 to the exchanger 111 and from the exchanger back to the tank so that even when the engine 12 has not run for a period of time, the liquids in the heat exchanger 111 are at a relatively high temperature sufficient to adequately preheat the engine. During periods of operation of the engine, the coolant is raised in temperature by passage through the heat exchanger 102 to a temperature sufficient to induce thermal syphoning action of potable water through the exchange 111 so that heat supplied to the exchanger 111 from the engine is transferred into the tank 13.

Figure 3:
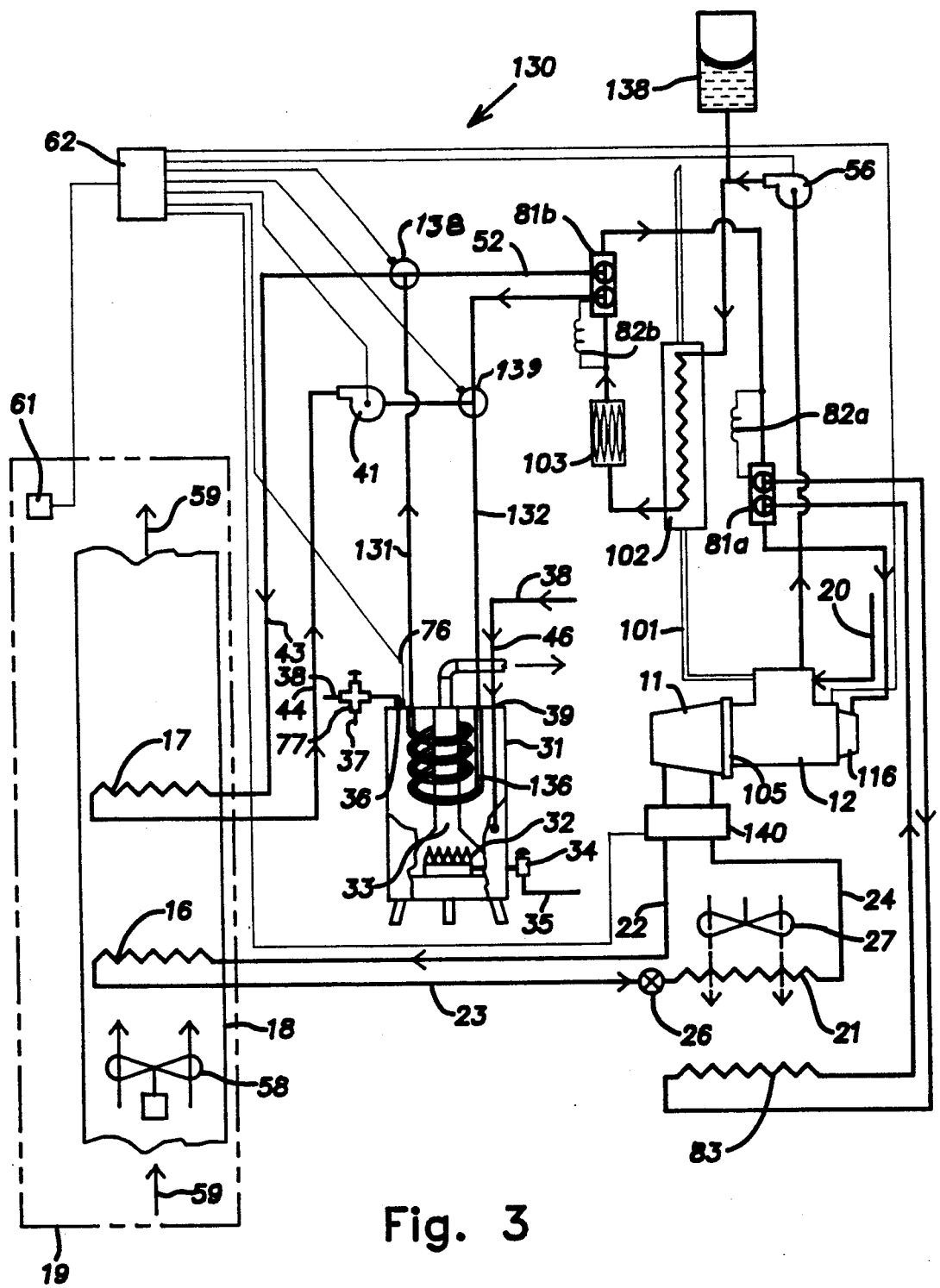
FIG. 3 is a schematic representation of still another embodiment of a heat pump system embodying the invention.

FIG. 3 schematically illustrates another system 130 for space conditioning. Elements having a correlation to the elements described in connection with FIGS. 1 or 2 have been designated with the same numerals. In this embodiment, engine coolant flows through lines 131, 132 for purposes of storing and/or using heat rejected by the engine 12 for heating potable water and/or for space heating. Coolant is circulated through the lines 131, 132 by the pump 116 mechanically driven by the engine 12 and/or by the electrically operated pump 56 controlled by the controller 62. An accumulator or expansion tank 138 of known construction is connected to the coolant system to account for thermal expansion.

A heat exchanger coil 136 for engine coolant is disposed within the tank 31 so that it is in heat exchange with the potable water contained in the tank. The coil 136 has a double wall construction and contains a buffer fluid in an annular space surrounding the inner tube. The buffer fluid, which can be dyed water, for example, serves to isolate the engine coolant (in the inner tube) from the potable water so that a leak which could result in mixing of the coolant and potable water will be readily detected in accordance with known health and safety code precautions.

As can be seen, the embodiment of FIG. 3 differs from that of FIGS. 1 and 2 in that the engine coolant, rather than potable water, is circulated in the liquid to air heat exchanger 17 for heating air in the conditioned space 19. This arrangement can effect savings in the cost of the heat exchanger 17 by reducing the pressure and corrosion resistance capacity of the heat exchanger.

The electrical pump 56 and directional control valves 138, 139 are operated under the control of the controller 62 to satisfy space conditioning demands of the space 19. A four-way cross-over valve 140, also controlled by the controller 62, and known for example from U.S. Pat. Reissue No. 31,281 allows the heat exchangers 17 and 21 to heat or cool the space 19.

The controller 62, positioning the valves 138, 139 in the appropriate positions and by operating the pump 56 in anticipation of a start-up of the engine 12 can preheat the engine compressor unit 12, 11 with heat from the tank 31. Once preheated, the engine 12 is started by the controller 62. Continued operation of the engine supplies its rejected heat to the tank 31 through circulation of coolant through the coil 136.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

I claim:

1. A heat pump system for an occupied space of a building comprising a fuel-fired heat engine and a heat pump compressor driven by the heat engine, the mechanical horsepower output capacity of the engine being substantially equal to the input power requirement of the compressor, an indoor refrigeration circuit heat exchanger in thermal communication with air in the occupied space, and an outdoor refrigeration circuit heat exchanger in thermal communication with the outdoor environment of the building, a refrigerant circuit connecting the refrigeration heat exchangers and the compressor to permit the compressor to pump heat between the heat exchangers when operated by the engine, a heat storage medium for absorbing heat rejected by the engine during its operation, the heat storage medium having a capacity to store a substantial quantity of heat for a period at least substantially as long as a maximum expected time that the engine is inoperative between ordinary cycles of operation, and means for selectively transferring said substantial quantity of heat stored in the storage medium to the engine to preheat the engine, after it has been at rest for a time sufficient to cool off, to a temperature substantially equal to its operating temperature.

2. A heat pump system as set forth in claim 1, including means to preheat the compressor to a desired minimum temperature while the engine is being preheated.

3. A heat pump system as set forth in claim 1, wherein said heat storage medium is a domestic hot water tank.

4. A heat pump system as set forth in claim 3, in which liquid engine coolant is in heat exchange relation with said hot water tank.

5. A heat pump system as set forth in claim 1, including a coolant for absorbing rejected heat from the engine, said means for selectively heating comprises a pump for circulating said coolant into heat exchange with the engine.

6. A heat pump system as set forth in claim 1, wherein said heat storage medium is a phase change material that absorbs and delivers heat at a generally constant temperature.

7. A heat pump system as set forth in claim 1, including a heat exchanger for delivering heat rejected by the engine to the air in the occupied space.

8. A heat pump system as set forth in claim 1, including a storage tank-type hot water heater for potable water and a heat exchanger in close proximity with the tank, the heat exchanger being arranged to exchange heat with potable water circulating to and from the tank by means of thermal syphon flow.

9. A heat pump system as set forth in claim 1, including an exhaust line for products of combustion from the engine, a heat exchanger for recovering heat from the exhaust line and means for transferring said exhaust heat recovered from the exhaust line to the heat storage medium.

10. A heat pump system as set forth in claim 9, wherein the recovered exhaust heat transfer means includes engine coolant circulated from the engine exhaust heat exchanger.

11. A heat pump system as set forth in claim 10, wherein the heat storage medium comprises a phase change material having a transition temperature at which it absorbs or delivers heat which is somewhat higher than the normal operating temperature of the engine coolant in the engine.

12. A heat pump system as set forth in claim 10, including a circuit for conveying engine coolant in a series path through the engine, the exhaust heat exchanger, the heat storage medium and a diverter valve, and control means operating the diverter valve to divert coolant for delivery of heat to a zone separate from said engine, exhaust heat exchanger and heat storage medium only after the temperature of the heat storage means exceeds a predetermined value whereby the heat storage means is replenished with heat as a first priority after the engine is started.

* * * * *